United States Patent Office 3,282,311
Patented Nov. 1, 1966

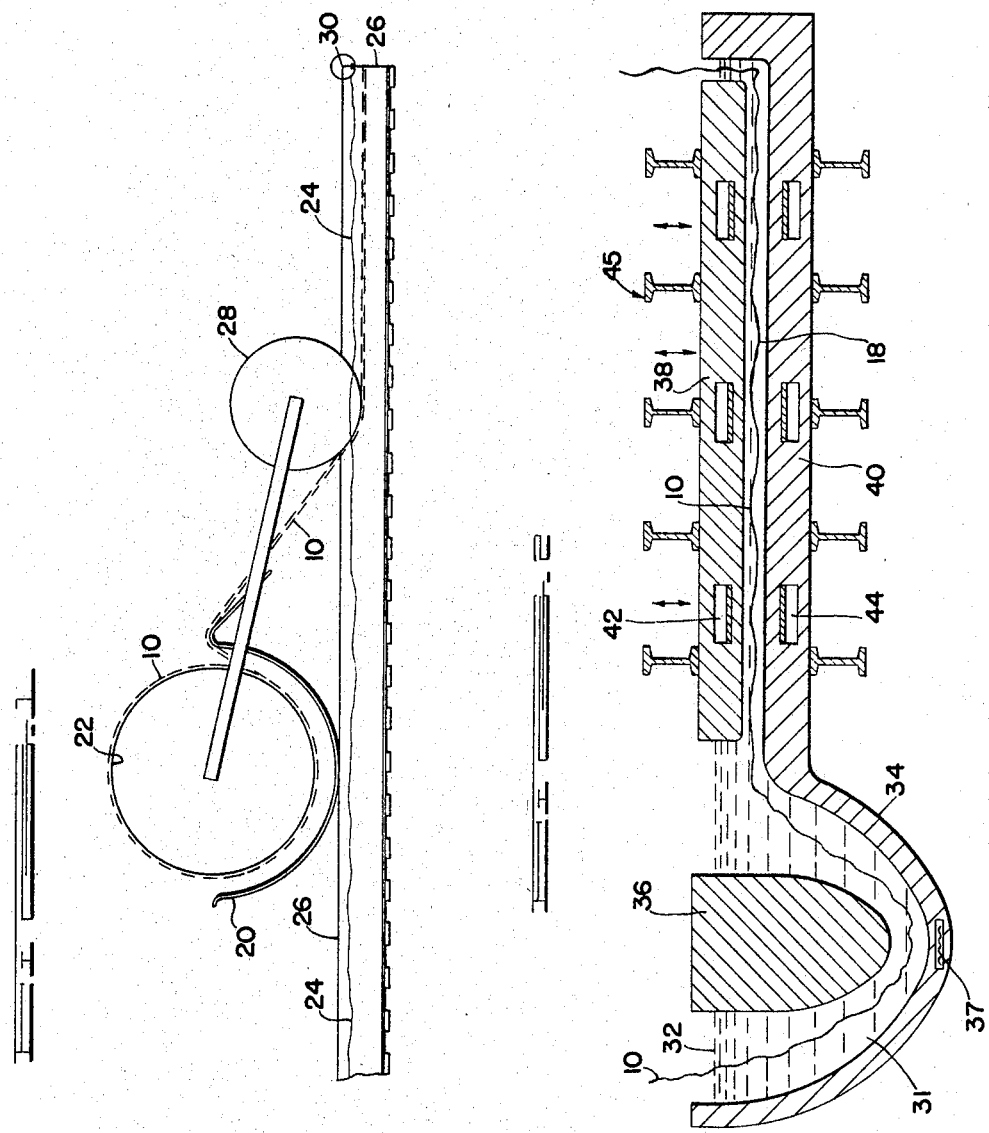

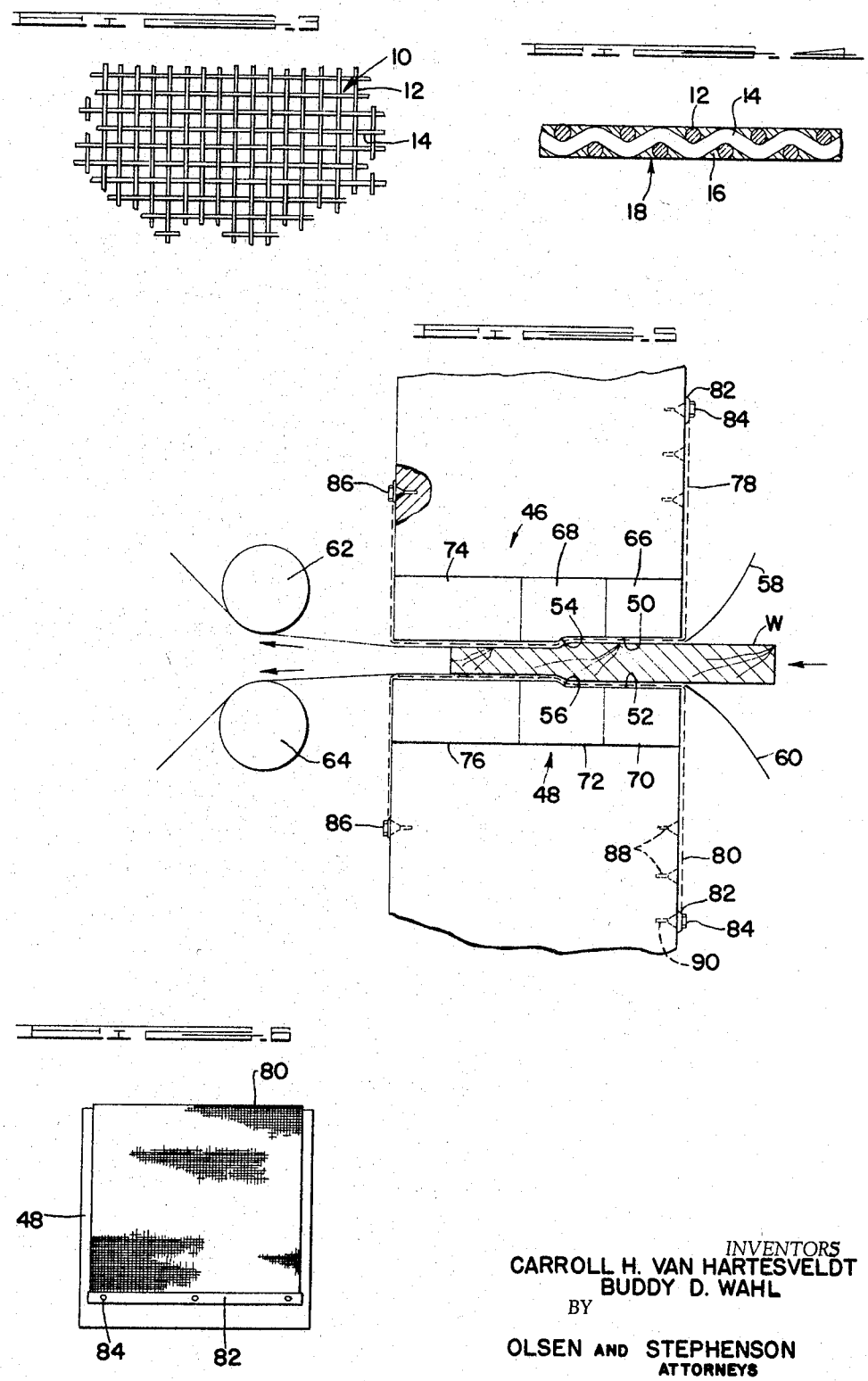

3,282,311
GRID BEARING SHEET
Carroll H. Van Hartesveldt and Buddy D. Wahl, Toledo, Ohio, assignors to Hoover Ball and Bearing Company, Ann Arbor, Mich., a corporation of Michigan
Filed Dec. 11, 1962, Ser. No. 243,946
11 Claims. (Cl. 144—2)

The present invention relates to an improved surface compressing mechanism employing an improved bearing sheet and particularly to a thin planar flexible bearing sheet for positioning between a travelling carrier sheet and a stepped surface such as the type having a step of a predetermined slope for forming a hardened layer on the surface of a cellular product.

In an apparatus of this type the surface of a workpiece is treated such as for polishing the surface or hardening the surface. In a hardening operation a workpiece formed of a cellular product such as wood is acted on by a platen having a surface with a compressing step of a predetermined slope to apply a local pressure for overcoming the compressive strength of the workpiece over a local area to permanently compress the surface and form a casehardened surface layer. An apparatus and method for performing this operation are disclosed in our copending application Serial No. 6,189, filed February 2, 1960, now Patent No. 3,171,167. The workpiece is carried over the stepped platen by a travelling carrier sheet which may be formed of a thin flexible stainless steel. Because of the pressures and forces employed, and the bending action encountered at the step, it is essential that the coefficient of friction between the moving carrier sheet and the stationary platen be reduced.

It is an object of the present invention to provide a thin strong flexible bearing sheet suitable for use in a compressing mechanism of the type above described.

A further object of the invention is to provide an improved grid bearing sheet having excellent tensile strength in a longitudinal direction and carrying soft bearing material, capable of long wearing operation between a sliding surface and a stationary surface.

A still further object of the invention is to provide a thin grid bearing sheet capable of withstanding high surface load pressures, providing low friction and low rates of wear, and which can be made thin and accurate in thickness.

A further object of the invention is to provide an improved method of making a bearing sheet having the above qualities and which is capable of obtaining a sheet of accurate and uniform thickness without voids and with an absence of corroded areas and foreign particles.

Other objects, advantages and features will become more apparent with the teaching of the principles of the invention in connection with the disclosure of the preferred embodiment of the specification, claims and drawings, in which:

FIGURE 1 is a schematic showing of the first stage of the process for making the bearing sheet of the invention;

FIGURE 2 is a schematic showing of the second stage of the process for making the bearing sheet of the invention;

FIGURE 3 is a plan view of a portion of screen material used in the making of the sheet;

FIGURE 4 is an enlarged sectional view taken through a completed bearing sheet;

FIGURE 5 is a side elevational view shown in somewhat schematic form of a mechanism using the bearing sheet; and FIGURE 6 is a fragmentary front elevational view of the machine of FIGURE 5.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology of terminology employed herein is for the purpose of description and not of limitation.

FIGURE 3 shows a fine woven screen 10 formed of individual wires 12 and 14.

The completed bearing sheet, is illustrated in FIGURE 4, incorporates the screen 10 with the wires 12 and 14 coated with a lead base bearing material 16 and with the interstices filled with the material to form the completed thin flexible bearing sheet 18.

The wire screen 10 is formed of strands of wire woven to a fine mesh. A mesh of 60 x 60 wire of .011" has been found satisfactory. The wire must be thin and flexible to provide a thin flexible finished bearing sheet of sufficient thinness that it will not transfer excessive heat between hot and cold sections in the mechanism shown in FIGURE 5.

The drawn annealed wires are chosen for good tensile strength and a wire composition of essentially 80% copper and 20% zinc is satisfactory. A preferred wire is a Phosphor bronze wire of the type used in Fourdrinier screens in papermaking machines, as will be recognized by those versed in the art.

The bearing material which is employed as a coating and filler in the screen is a soft lead based material of lead or a lead alloy such as babbit. Various softer materials may be employed as will be appreciated by those versed in the art.

In previous efforts to make the bearing sheet, it was found that the use of an acid flux for preparing and cleaning the screen, followed by an ordinary immersion of the screen in babbit was not successful, because an oxide formed on the babbit coated wire which prevented adhesion of added babbit to the screen. Further, when wire screen was placed in a pool of molten babbit and then pressed to flatten the screen, oxide occlusions and voids formed in the sheet. Also, corrosion of the bronze screen occurred if the acid solution were allowed to dry before dipping into babbit. The oxidation formed a green oxide that prevented adhesion of the babbit to the wire.

As illustrated in FIGURES 1 and 2, in a preferred method of making the thin bearing sheet 18, the first step is to apply a preliminary coating on the screen 10 of the bearing metal to be used. An aqueous flux is used which is acid in nature containing chlorides and organic material. This flux is the type used for stainless steel and other metals which are difficult to adhere. The flux is active in the 400'–850° F. range. It is placed in the flux tank 20, shown in FIGURE 1.

Before the screen 10 is wrapped around the screen roll 22, and placed in the flux tank 20, the screen 10 is thoroughly cleaned and vapor degreased.

The babbit 24 in the babbit tank 26 is heated to 650° F. and the flux tank 20 with attached hold down roll 28 is positioned as far to the right as possible. The screen 10 is then reeled off the screen roll 22, passed under the hold down roll 28 and clamped to the edge 30 of the babbit tank 26, as shown. When this is done the flux tank 20 is moved at a speed of two feet per minute to the left. As it moves, the screen 10 unwinds out of the flux tank 20 and is pressed into the molten babbit 24 by hold down roll 28.

The above procedure accomplishes two important functions. First, the screen 10 enters the molten babbit 24 wet with flux. In other words, it is essential that the aqueous flux not be allowed to evaporate or drain off the screen 10 prior to immersion in the molten babbit 24. If it does, babbit will not coat or "tin" the drained or dried areas. Secondly, the whole screen 10 is immersed in babbit 24 at the proper temperature. Normally, the latent heat of the evaporating flux will cool the babbit appreciably. By having a sufficient depth of molten babbit (about one inch), and by rolling out the screen 10 as described, there is ample heat in the babbit 24 to evaporate the flux and still remain hot enough to wet or "tin" the screen 10.

After the screen 10 is "tinned," it is allowed to cool and then scrubbed thoroughly under hot water. The purpose of this step is to remove all water soluble salts and acids as well as the organic matter originally present in the flux solution.

The cleaned and dried screen 10 is then inserted in the babbit 31 at 32 in the container 34, shown in FIGURE 2. The container 34 is divided by a center baffle 36 under which the screen 10 is passed. The babbit 31 is maintained in a molten condition by a suitable heater 37.

The screen 10 is then threaded beneath a floating platen 38 which has a lower pressure surface submerged beneath the surface of the molten babbit 31. Below the floating platen 38 is a lower platen 40, and the screen 10 is drawn between the platens 38 and 40 without being exposed to ambient air and while remaining submerged beneath the babbit 31. The platens 38 and 40 are provided with heating elements 42 and 44 which maintain the babbit 31 in a molten condition while the screen is being threaded between the platens 37 and 40, and which are controllable so that they can be turned off for cooling the babbit.

The two platens 38 and 40 are then squeezed together under a load of substantially 100 pounds per square inch and the heater 42 and 44 are turned off. After the babbit has hardened, the platens are separated and the grid bearing sheet 18 is removed. Suitable controls for the heaters 42 and 44 are provided, and suitable pressure applying means 45 are provided for the platens, and these structural elements will be appreciated by those skilled in the art and need not be shown in detail.

The finished sheet 18 has a thickness of .020 inch using .010 wire screen. The temperature of the molten babbit must be controlled to avoid corroding away the fine bronze wires. A temperature of 700° F. or above causes the screen to disappear completely. A preferred temperature which avails good results is wherein the babbit is not permitted to exceed 550° F. using a conventional high lead babbit and a 40 to 60 mesh Phosphor bronze screen.

Prior to preparing a bearing sheet, and when the babbit is first molten and before the upper platen 38 is floated, all oxide is raked off the surface. After the upper platen is floated on the babbit pool and before the screen is fed in, a piece of folded screen is dragged through between the platens to remove whatever traces of oxide which may be left.

FIGURE 5 illustrates a mechanism for treating the surface of a product shown as a workpiece W. The mechanism includes upper and lower platens 46 and 48 with operating surfaces 50 and 52 and the surfaces are provided with steps 54 and 56. One application of the mechanism is in the forming of a case hardened layer on the outer surfaces of the workpiece W by the provision of steps 54 and 56 of a predetermined slope. The workpiece W in this case is a cellular product preferably formed of a cellulose such as wood, and the operation and method are set forth in our copending applications Serial No. 6,189, filed February 2, 1960, now Patent No. 3,171,167, and Serial No. 70,498, filed November 21, 1960, now Patent No. 3,159,526. Travelling carrier sheets or belts 58 and 60 of thin stainless steel slide over the surfaces 50 and 52 of the platens carrying the workpiece W therethrough. The belts 58 and 60 are suitably driven and pass over rolls such as illustrated at 62 and 64'.

In the treatment of a cellulose product, the platens incorporate first and second heaters 66 and 68 for the upper platen, and 70 and 72 for the lower platen. The heaters are followed by cooling units 74 and 76 respectively for the upper and lower platens. With this process which incorporates substantial heating and subsequent immediate or shock cooling, it is essential that a minimum amount of heat be transferred across between the heating elements and coolers, and they are separated in the platen by insulators. However the thickness of the bearing sheet must be maintained at a minimum to prevent the transfer therethrough.

Bearing sheets 78 and 80 are stationarily positioned over the surfaces 50 and 52 of the platen. The thin bearing sheets conform to the stepped surface of the platen and provide a low friction bearing surface for the stainless steel carrier sheets 58 and 60 sliding over the platens. Since the stainless steel sheets must flex through the curvature of the steps 54 and 56 it is necessary that they be thin, and to avoid exceeding their tensile strength it is essential that the coefficient of friction be maintained low.

The bearing sheets 78 and 80 are each anchored on the platens to be stationary with respect thereto, and the lead end of the bearing sheet is clamped by bars 82 which are held to the platen by bolts 84. The trailing end of the bearing sheet is held by clamps 86 also bolted to the platen. The maximum wear on the bearing sheet will occur at the step and for extending the wearing life of the bearing sheets, they are adjustably held so that they can be shifted. Thus the bearing sheet can be periodically shifted so that the step is positioned at different locations increasing the bearing sheet wearing life. This is accomplished by providing a series of threaded openings 88 for the bolts 44, which are shown threaded into the openings 90. By periodically shifting the bolts upwardly to the successive holes, the bearing sheet will be shifted. The clamp 86 at the trailing end can be opened to regrip the bearing sheet as it is shifted.

Thus it will be seen that there has been provided an improved method of making a bearing sheet, and a bearing sheet and bearing sheet assembly for a surface treating mechanism, which meets the objectives and advantages above set forth.

Having thus described our invention, we claim:

1. A surface compressing mechanism comprising a platen having a stepped forming surface, a travelling carrier sheet, and a flexible thin planar bearing sheet stationarily located between the platen and carrier sheet including wires arranged in a screen-like unit having a high tensile strength in a longitudinal direction with respect to the travel of the carrier sheet, said bearing sheet having a relatively soft bearing material coating said wires and impregnating the interstices between the wires for slidingly engaging the travelling flexible sheet carrying the product along the stepped forming surface.

2. In a machine for forming a surface layer on a product comprising a forming surface for receiving the product having a compressing step, means for holding the product against said surface, a travelling conveying sheet movable over the surface to carry the product past the step, a stationary thin flexible bearing sheet over said surface having a grid with openings therein and soft bearing material in said openings, and means for holding said bearing sheet stationary with respect to said forming surface.

3. In a machine for compressing a surface on a product comprising a forming surface for receiving the product having a compressing step, means for holding the product against said surface, a travelling conveying sheet movable over the surface to carry the product past the step, a stationary thin flexible bearing sheet over said surface having a grid with openings therein and soft bearing material in said openings, means for holding said bearing sheet stationary with respect to said surface, and means for adjusting the position of said bearing sheet relative to the step.

4. In a machine for forming a surface layer on a product comprising a forming surface for receiving the product having a compressing step, means for holding the product against said surface, a travelling conveying sheet movable over the surface to carry the product past the step, a stationary thin planar flexible bearing sheet formed of copper alloy wires positioned over said surface, a lead base bearing material impregnated in the openings between said wires, and means for holding said bearing sheet stationary with respect to the surface.

5. In a machine for compressing a surface on a product, the combination comprising a pair of opposed platens having facing compressing surfaces with compressing steps, endless belts trained over said surfaces for carrying a product through between the surfaces, stationary flexible bearing sheets over the surfaces and anchored with respect thereto for slidably engaging the endless belts, said bearing sheets formed of metal screens with a bearing alloy coating and filling the openings of said screens, and means for anchoring said screens.

6. In a machine for forming flat workpieces, the combination comprising a pair of opposed platens having facing surfaces, belts trained over said surfaces for carrying a workpiece through between said surfaces, stationary flexible bearing sheets over said surfaces and anchored with respect thereto so as to be slidably engageable by said belts, said bearing sheet including means for resisting deformation when subjected to tension in the direction of movement of said belts.

7. A flexible bearing sheet with a longitudinal axis for positioning between two surfaces movable relative to each other such as a stepped forming surface and a travelling carrier sheet comprising a flexible thin planar sheet formed of two sets of crossed wires with the wires of one set extending parallel to one another and to said longitudinal axis so that the bearing sheet resists deformation when subjected to tension in the direction of said longitudinal axis, and a lead base bearing material coating said wires and impregnated in the interstices between the crossed wires in an amount insufficient to impair the flexible characteristics of the bearing sheet.

8. A flexible bearing sheet according to claim 7, wherein means are attached to one end of said one set of wires for anchoring said one set of wires.

9. A flexible bearing sheet with a longitudinal axis for positioning between two surfaces movable relative to each other comprising a flexible thin planar sheet formed of two sets of woven wires of phosphor bronze with the wires of one set extending parallel to one another and to said longitudinal axis, and a lead base bearing metal impregnated in the interstices between the wires of the two sets.

10. A flexible bearing sheet with a longitudinal axis for positioning between two surfaces movable relative to each other comprising a flexible thin planar sheet formed of two sets of woven wires of copper alloy wire with the wires of one set extending parallel to one another and to said longitudinal axis, and a lead base bearing metal coating the wires and impregnated in the interstices between the woven wires.

11. A flexible bearing sheet with a longitudinal axis for positioning between a forming surface and a travelling sheet comprising a flexible thin planar sheet formed of two sets of woven wire having a composition of essentially 80% copper and 20% zinc with the wires of one set extending parallel to one another and to said longitudinal aixs, and a lead base bearing metal coating said wires and impregnated in the interstices between the wires.

References Cited by the Examiner

UNITED STATES PATENTS

| | | | |
|---|---|---|---|
| 514,847 | 2/1894 | DuBois | 144—2 |
| 638,477 | 12/1899 | Scheid | 144—2 |
| 816,253 | 3/1906 | Randall | 308—239 |
| 1,234,254 | 7/1917 | Apostoloff | 29—191.4 |
| 1,581,394 | 4/1926 | Dann | 308—239 |
| 1,670,817 | 5/1928 | McCleary | 118—74 |
| 1,815,187 | 7/1931 | Coles | 29—191.4 |
| 1,888,913 | 11/1932 | Erichsen | 22—67 |
| 2,223,355 | 12/1940 | Gonser et al. | 118—74 |
| 2,326,372 | 8/1943 | Lignian | 117—114 |
| 2,525,603 | 10/1950 | Jenks et al. | 117—114 |
| 2,615,768 | 10/1952 | Schluchter | 308—239 |
| 2,886,074 | 5/1959 | Beitz | 144—2 |
| 3,104,433 | 9/1963 | Hoern | 22—67 |
| 3,138,837 | 6/1964 | Weeton et al. | 22—203 |
| 3,149,383 | 9/1964 | Seyffer et al. | 22—203 |

WILLIAM W. DYER, JR., *Primary Examiner.*

RALPH S. KENDALL, *Examiner.*

W. D. BRAY, *Assistant Examiner.*